3,169,999
AROMATIC ALKYLATION PROCESS UTILIZ-
ING A NICKEL-CHROMIA-SILICA-ALUMINA
CATALYST
Henry Erickson and Glenn O. Michaels, Park Forest, Ill.,
assignors to Sinclair Research, Inc., Wilmington, Del.,
a corporation of Delaware
No Drawing. Filed Sept. 15, 1961, Ser. No. 138,281
7 Claims. (Cl. 260—671)

This invention relates to the alkylation of aromatics with olefin alkylating agents and is particularly concerned with a catalytic alkylation process employing a hydrocarbon conversion catalyst consisting essentially of catalytic amounts of each of nickel and chromia on a silica-alumina catalytic support. Alkylated aromatics are of value in many fields and some are particularly desirable as constituents of high octane aviation fuels and as sources of synthetic detergents.

Although catalytic processes for the allkylation of aromatics have been suggested, the present process provides good utilization of alkylating agents, low carbon laydown on the catalyst, good catalyst aging characteristics, low disproportionation or isomerization, and a readily regenerable catalyst.

Catalysts containing chromium oxide supported on an acidic type base such as silica-alumina have been widely used for the polymerization of olefins to high molecular weight polymers. However, it is just such activity which makes them unsuitable for alkylation reactions involving olefins. It has now been found that the addition of small amounts of nickel oxide to conventional silica-alumina-chromia polymerization catalysts almost completely suppresses the polymerization activity but does not destroy the acidic nature of the catalyst. Such catalysts have been found to be highly selective for the alkylation of aromatics with olefins and, in particular, for the preparation of ethyl benzene from benzene and ethylene.

The alkylation is accomplished in the present process by employing a particularly effective catalyst which includes catalytically effective amounts of nickel and chromia on a silica-alumina base. The catalyst generally contains from about 0.2 or 4 or 5 weight percent nickel and about 1 to 15 weight percent, preferably from about 1 to 8 weight percent chromia, based on the total catalyst. The ratio of silica to alumina can be varied between wide limits, for instance about 5 to 50 percent alumina and 50 to 95 percent silica, and concentration ranges of about 75–90% $SiO_2$ and about 10–25% $Al_2O_3$ are advantageous. The preferred silica-alumina base is synthetic gel silica-alumina.

The nickel and chromia components can be added to the silica-alumina catalyst by known procedures involving impregnation or coprecipitation. Salts of chromium and nickel other than the nitrate can be used such as the sulfates and the chlorides but the nitrates have the advantage that they decompose to the oxides after calcination without leaving a residue which is difficult to wash out. When employing the impregnation procedure the resulting impregnated product can be dried generally at a temperature within the range of 170° F. to 400° F. for at least about 6 hours and up to about 24 hours or more with a stream of air circulated to carry off the water vapor. The dried catalyst mixture then may be formed by a tabletting or extruding operation. If the catalyst is to be in finely divided form, a grinding operation may follow drying. In the case of tabletting it is customary to incorporate a die lubricant which advantageously is organic and can be burned out by oxidation in the calcination step. The product after drying generally contains a substantial amount of water which is drawn off at temperatures about about 400° F.

The dried pellets are suitable for subjection to high temperature treatment or calcination at a temperature between about 500° F. and about 1500° F., usually between about 700° F. and 1000° F., for instance, for a period of between about 2 and about 36 hours. It is generally preferred that the calcining operation be conducted in a manner minimizing contact time of the silica-alumina-containing product with water vapor at the high temperatures encountered. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen. The silica-alumina impregnated with the catalytically active components, is fully cooled to yield the finished product.

The catalyst employed in the process of the present invention can be easily regenerated employing conventional procedures, for instance by subjecting it to an oxygen-containing gas at temperatures sufficient to burn off carbon deposited on the catalyst during the alkylation. This oxygen-containing gas, e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

In accordance with the present invention, the nickel-chromia-silica-alumina catalysts are advantageously employed to alkylate aromatics with olefinic materials. The aromatics, e.g. alkylatable aromatic hydrocarbons, suitable for alkylation in the present process include mono- and polycyclic aromatic hydrocarbon compounds such as benzene and its lower alkyl homologues, e.g. toluene and the xylenes, naphthalene, and indane, which may be substituted or unsubstituted. The substituted aromatic compounds must, however, contain at least one hydrogen attached to the aromatic nucleus and are preferably methyl-substituted. These compounds may correspond to the general formula

where R is an alkyl, including cyclo alkyl, radical containing generally from about 1 to 20, preferably from about 1 to 8, carbon atoms; $n$ is 0 to 3 or 5; R′ is an aromatic hydrocarbon rings, preferably $C_4H_4$; -$f$- indicates a fused ring relationship (two carbon atoms common to two aromatic nuclei, e.g. as in naphthalene); and $m$ is generally 0 to 1 or more. R may also be a divalent hydrocarbon group attached to the aromatic ring at two carbon atoms of the ring, e.g. alkylene, as in decalin and tetralin. The preferred aromatics, however, include alkyl benzenes corresponding to the above formula when m is 0. The aromatic rings and R groups may be substituted as with phenyl, hydroxy, alkoxy, halide and other radicals which do not prevent the desired reaction. Suitable aromatic hydrocarbons include benzene, toluene, orthoxylene, meta-xylene, para-xylene, ethyl-benzene ortho-ethyltoluene, meta-ethyltoluene, para-ethyltoluene, 1,2,3-trimethylbenzene, 1,2,4-trimethylbenzene, 1,3,5-trimethylbenzene or mesitylene, normal propylbenzene, isopropylbenzene, etc. Higher molecular weight alkyl aromatic hydrocarbons are also suitable as starting materials and include aromatic hydrocarbons such as are produced by the alkylation of aromatic hydrocarbons with olefinic polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons containing condensed benzene rings include naphthalene, alpha-methylnaphthalene, beta-methylnaphthalene, anthracene, phenanthrene, naphthacene, rubrene, etc.

The alkylating agents suitable for use in the present process are olefins, generally containing from about 2 to 20 carbon atoms, preferably from about 2 to 6 carbon atoms.

The olefins can contain substituents such as aryl, cycloalkyl and other non-interfering groups.

A number of preferred alkylating agents correspond to the general formula:

$$R-CH=CH_2$$

where R is a monovalent hydrocarbon radical such as aryl, alkyl, including cycloalkyl, usually lower alkyl and preferably containing 1 to 4 carbon atoms. The alkylating agents usually do not have more than about 18 carbon atoms, preferably up to about 12 carbon atoms. Examples of preferred α-olefins which may be used are ethylene, propylene, butylene, isobutylene and amylene.

The alkylation reaction conditions used in the method of the present invention preferably include a temperature sufficient to maintain the aromatic and alkylating agent feeds in the vapor phase under the pressure employed. This temperature may often be from about 200 to 600° F., preferably from about 300 to 450° F. while the pressure may range from about ambient pressures or less up to about 2000 p.s.i.g, e.g. about 0 to 2000 p.s.i.g., and are preferably elevated pressures ranging from about 200 to 600 p.s.i.g. The catalyst can be used as a fixed, moving or fluidized bed or in any other convenient type of handling system. The aromatic space velocity will in most cases be from about 0.1 to 10, preferably from about 0.1 to 5, weights of aromatic per weight of catalyst per hour (WHSV). The aromatic is generally employed in a molar ratio to the alkylating agent of about 1 to 20:1 and preferably of about 1 to 5:1. Diluent gases, e.g. inert or hydrocarbon, such as $H_2$, $N_2$ and $CH_4$ can also be utilized in the present process usually in the amounts ranging from a diluent gas to alkylating agent molar ratio of about 0.01 to 20:1 or more, preferably about 2 to 10:1.

The following examples will serve to illustrate the invention but they are not to be considered limiting.

EXAMPLE I

*Catalyst preparation*

354 g. of a commercial synethetic microspheroidal silica-alumina cracking catalyst (87% silica, 13% $Al_2O_3$), equivalent to 281 g. ignited basis, were impregnated with 495 ml. of an aqueous solution of 24.1 g. $Cr(NO_3)_3 \cdot 9H_2O$ and 7.46 g. $Ni(NO_3)_2 \cdot 6H_2O$. This volume was sufficient to saturate the catalyst without excess. The impregnated catalyst was dried 20 hours at 230° F. in a forced draft oven, cooled and passed through a 20 mesh screen to break up any lumps. The weight 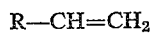 of screened powder was 363 g. This powder was thoroughly blended with 13.7 g. finely ground Sterotex, a hydrognated corn oil widely used as a pelleting die lubricant. The mixture was formed as ⅛ x ⅛ inch tablets in a rotary tabletter. The tablets were placed in an electrically heated muffle, heated to 900° F. at the rate of 300° F. per hour and calcined 6 hours at 900° F. The temperature was raised to 1400° F. in about 30 minutes and the pellets recalcined for 5 hours at 1400° F. This catalyst is that used in Example II, below and contained 1.5% NiO, 3% $Cr_2O_3$ supported on 96.5% silica-alumina.

EXAMPLE II

This example was conducted according to the following procedure. A 1-inch internal diameter Universal stainless steel reactor heated by radiant heat and bronze-block furnace was employed. The temperature of the reactor was controlled by Fenwall thermostats and the temperature of the catalyst bed was measured by means of Iron-Constantan thermocouples located throughout the bed.

250 cc. (153 grams) of the catalyst of Example I was charged to the 1-inch Universal reactor. The catalyst was treated with air as the temperature was raised to 1500° F. and maintained at 1500° F. for ½ hour.

The aromatic and alkylating agents were blended in the indicated ratio and charged to the reactor from a graduated blowcase by nitrogen (diluent gas) displacement. Both the diluent gas and liquid feed were metered to the reactor through Fischer-Porter rotameters.

The liquid products were separated from effluent gases in a Jerguson liquid-level gauge and then released to atmospheric pressure at room temperature. The volume of dry gas was measured by means of a wet test meter and spot and continuous gas samples were taken. The gas samples were analyzed by mass spectrometer techniques. Total hydrocarbon analyses were by vapor phase chromatography. The example was conducted under the conditions specified in Table I and the results for the example are also presented in this table.

TABLE I

[Catalyst: 1.5% NiO–3% $Cr_2O_3$–96.5% $SiO_2$—$Al_2O_3$]

| | |
|---|---|
| Feed | 4.22/1 mole ratio of benzene to ethylene. |
| Feed rate: | |
|   Feed rate of benzene | 3.62 WHSV. |
|   Feed rate of ethylene | .31 WHSV or 150 v./v. hour at STP. |
| Conditions: | |
|   Temperature | 384° F. |
|   Pressure | 450 p.s.i.g. |
| Results (based on ethylene): | |
|   Total Conversion of ethylene | 25.7%. |
|     Conversion to ethyl benzene | 23.0%. |
|     Conversion to diethyl benzene | 2.5%. |
|     Conversion to other products [1] | 0.19%. |
|     Selectivity to ethyl benzene | 89.5%. |
|     Selectivity to diethyl benzene | 9.74%. |
|     Selectivity to other products | 0.74%. |

[1] Mainly $C_4=$. No detectable amount of coke was formed.

EXAMPLE III

For comparison, data are presented below on a $$SiO_2\text{—}Al_2O_3\text{—}Cr_2O_3$$

catalyst with no nickel present on the catalyst. The catalyst used in Example III was prepared by impregnating the same commercial microspheroidal silica-alumina catalyst of Example I with an aqueous solution of $CrO_3$. Drying tabletting and calcination duplicated that described above in Example I.

TABLE II

[Catalyst: 3% $Cr_2O_3$ on $SiO_2$—$Al_2O_3$]

| | |
|---|---|
| Pretreat | Air overnight at 1400° F. |
| Feed rate: | 1.34 WHSV. |
| Feed rate of benzene | 0.384 or 177 |
| Feed rate of ethylene | v./v./hour. |
| Conditions: | |
| Temperature | 326° F. |
| Pressure | 600 p.s.i.g. |
| Results: | |
| Percent Conversion of ethylene | 45% (100% selectivity to high molecular weight polyethylene). |

No ethyl benzene or higher alkyl benzenes directed.

It is apparent from the data in Tables I and II that the addition of nickel in relatively small amounts radically modifies the conventional $SiO_2$—$Al_2O_3$—$Cr_2O_3$ polymerization catalyst. Whereas the $SiO_2$—$Al_2O_3$—$Cr_2O_3$ catalyst produced high molecular weight polyethylene almost exclusively, the nickel containing catalyst was over 99% selective for the formation of alkyl benzenes. Only minor amounts of butenes were observed (<1%) and no detectable amount of coke was formed. Higher conversions of ethylene can be obtained by increasing the temperature and pressure or by lowering the feed rate. Because of the wide separation of the boiling points of the feed and products, they can easily be separated from each other by distillation. Recycle of the feed to extinction is easily accomplished. The selectivity of the process to diethyl benzene can be modified by changing the temperature, pressure, and aromatic to olefin ratio.

The process is equally suitable for the preparation of other alkyl aromatics for example, benzene can be alkylated with propylene or isobutylene to form cumene or t-butyl benzene, respectively. Durene can be prepared by the alkylation of xylenes with ethylene to form ethyl xylene which can then be isomerized to the tetramethyl benzenes (durene, isodurene, and prehnitene).

We claim:

1. A process of alkylating an alkylatable aromatic hydrocarbon which comprises contacting the alkylatable aromatic hydrocarbon with an olefin under alkylation conditions including a temperature of about 200 to 600° F. in the presence of a catalyst consisting essentially of catalytic amounts of nickel and chromia on a silica-alumina support.

2. The process of claim 1 wherein the alkylatable aromatic hydrocarbon corresponds to the structural formula:

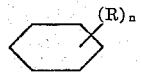

where R is an alkyl radical containing from about 1 to 8 carbon atoms; n is 0 to 3.

3. The process of claim 1 wherein the olefin contains 2 to 6 carbon atoms.

4. The process of claim 1 where the olefin is an α-olefin.

5. The process of claim 1 wherein the catalyst consists essentially of about 0.2 to 5% by weight of nickel and about 1 to 15% by weight of chromia.

6. The process of claim 1 wherein the alkylatable aromatic hydrocarbon corresponds to the structural formula:

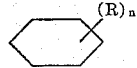

where R is an alkyl radical containing from about 1 to 8 carbon atoms; n is 0 to 3 and the olefin is an α-olefin of 2 to 6 carbon atoms.

7. The process of claim 6 wherein the alkylatable hydrocarbon is benzene and the olefin is ethylene.

References Cited in the file of this patent

UNITED STATES PATENTS

| | | |
|---|---|---|
| 2,383,179 | Eglogg | Aug. 21, 1945 |
| 2,500,197 | Michael et al. | Mar. 14, 1950 |
| 2,691,647 | Field et al. | Oct. 12, 1954 |